(No Model.)

A. PARKINSON.
CAR COUPLING.

No. 471,019. Patented Mar. 15, 1892.

WITNESSES:
F. McArdle.
C. Sedgwick

INVENTOR:
A. Parkinson
BY Munn & Co
ATTORNEYS

United States Patent Office.

ARTHUR PARKINSON, OF VIAN, INDIAN TERRITORY.

CAR-COUPLING.

SPECIFICATION forming part of Letters Patent No. 471,019, dated March 15, 1892.

Application filed July 8, 1891. Serial No. 398,842. (No model.)

*To all whom it may concern:*

Be it known that I, ARTHUR PARKINSON, of Vian, Cherokee Nation, Indian Territory, have invented a new and Improved Car-Coupling, of which the following is a full, clear, and exact description.

My invention relates to improvements in car-couplings; and the object of my invention is to produce an extremely simple coupling which will enable two cars to be positively and automatically coupled, which may be operated to uncouple the cars without danger to the brakeman, and which may, if necessary, be used with the old-fashioned coupling having the usual link and pin.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1:
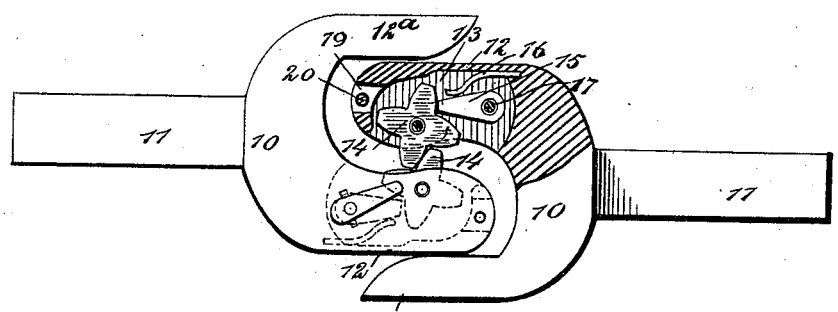
Figure 2:
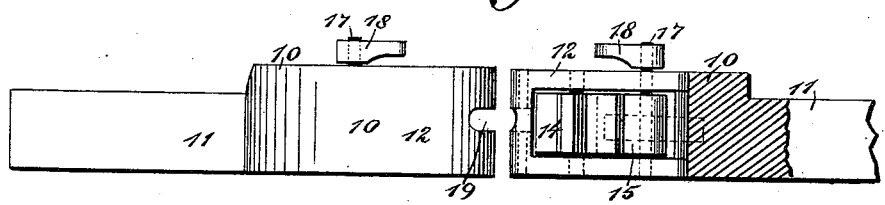
Figure 3:
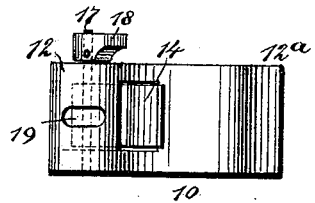

Figure 1 is a plan view, partly in section, of two united couplings embodying my invention. Fig. 2 is a broken side elevation of two approaching couplings, and Fig. 3 is a front end view of one of the couplings.

The coupling is provided with a forked draw-head 10, having a rearwardly-extending shank 11, which may be secured in any ordinary frame, and the forked portion of the draw-head has two parallel forwardly-extending members 12 and $12^a$, the member 12 being horizontally recessed, as shown at 13, and having pivoted in this recess a cog-wheel 14, which has, preferably, four teeth, but may have any desired number, the teeth being arranged so that as the wheel is turned one of them will constantly project into the central opening of the draw-head. In the recess 13 and immediately behind the wheel 14 is a pawl 15, which is pressed by a spring 16, so as to enable it to engage the teeth of the cog-wheel, and the pawl will thus prevent the cog-wheel from turning in the wrong direction. The pawl 15 is fixed to a pin 17, which is journaled in the draw-head and extends vertically through the member 12 thereof, and this pin has at its upper end a crank 18, by means of which it may be turned and the pawl thrown out of engagement with the wheel to uncouple the cars. This crank 18 may be connected by any of the ordinary chain and lever mechanisms with the top and sides of a car. The member 12 of the draw-head is provided at its front end with a recess 19, which is adapted to receive an ordinary coupling-link, and extending vertically through this recess is a removable coupling-pin 20, by means of which a link may be held in the recess in the ordinary way.

The coupling operates as follows: When two draw-heads are pushed together, the member 12 of one will enter the central opening in the other, as shown in Fig. 1, and the cog-wheels 14 of the draw-heads will engage each other, but the pawls 15 will yield and allow the teeth to pass, and when the teeth of the wheels have passed and interlocked, as in Fig. 1, the draw-heads will be held firmly together and cannot be accidentally disengaged, as the pawls 15 will prevent the wheels from turning back. When the cars are to be uncoupled, one of the pawls 15 is thrown back against the spring 16 by means of the crank 18, thus allowing its cog-wheel to turn freely, and the draw-heads may then be easily separated.

From the foregoing description it will be seen that the coupling is so simple that it cannot get out of order, and it will be noticed that when two draw-heads are pushed together they must couple automatically, and that they can be uncoupled by simply turning one of the cranks 18.

Having thus fully described my invention, I claim as new and desire to secure by Letters Patent—

1. A car-coupling comprising a forked draw-head, a toothed wheel mounted in one member of the draw-head and arranged to project into the central opening thereof, and a handled pawl to engage the wheel, substantially as described.

2. A car-coupling comprising a forked draw-head, a toothed wheel pivoted in one member of the draw-head and projecting into the central opening of the draw-head, a spring-pressed pawl pivoted in the draw-head and adapted to engage the toothed wheel, and a lever mechanism for turning the pawl against the spring, substantially as described.

ARTHUR PARKINSON.

Witnesses:
W. J. QUILLIAN,
T. CORNELIUS.